United States Patent
Rong

(10) Patent No.: US 6,898,336 B2
(45) Date of Patent: May 24, 2005

(54) FIBER OPTIC POLARIZATION BEAM COMBINER AND SPLITTER

(75) Inventor: Haisheng Rong, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 10/611,214

(22) Filed: Jun. 30, 2003

(65) Prior Publication Data

US 2004/0264830 A1 Dec. 30, 2004

(51) Int. Cl.[7] .............................................. G02B 6/00
(52) U.S. Cl. ............................ 385/11; 385/35; 385/36; 359/495
(58) Field of Search ............................... 385/11, 16, 33, 385/35, 36; 359/495, 496, 251, 497

(56) References Cited

U.S. PATENT DOCUMENTS 6,529,325 B1 * 3/2003 Kokkelink et al. ......... 359/497
6,690,501 B2 * 2/2004 Li et al. ..................... 359/251

* cited by examiner

Primary Examiner—Phan T. H. Palmer
(74) Attorney, Agent, or Firm—Blakely, Sokoloff, Taylor & Zafman LLP

(57) ABSTRACT

The disclosure describes an embodiment of an apparatus comprising a single-fiber collimator, a polarization beam displacer positioned to receive an unpolarized beam from the single-fiber collimator, a roof prism positioned to receive a first polarized beam and a second polarized beam from the polarization beam displacer, a multi-fiber collimator positioned to receive the first and second polarized beams from the roof prism. Also described is an embodiment of a process comprising collimating an unpolarized beam, separating the unpolarized beam into first and second polarized beams using a polarization beam displacer, converging the first and second polarized beams using a roof prism, and focusing the first and second polarized beams into first and second optical fibers. Other embodiments are described and claimed.

43 Claims, 8 Drawing Sheets

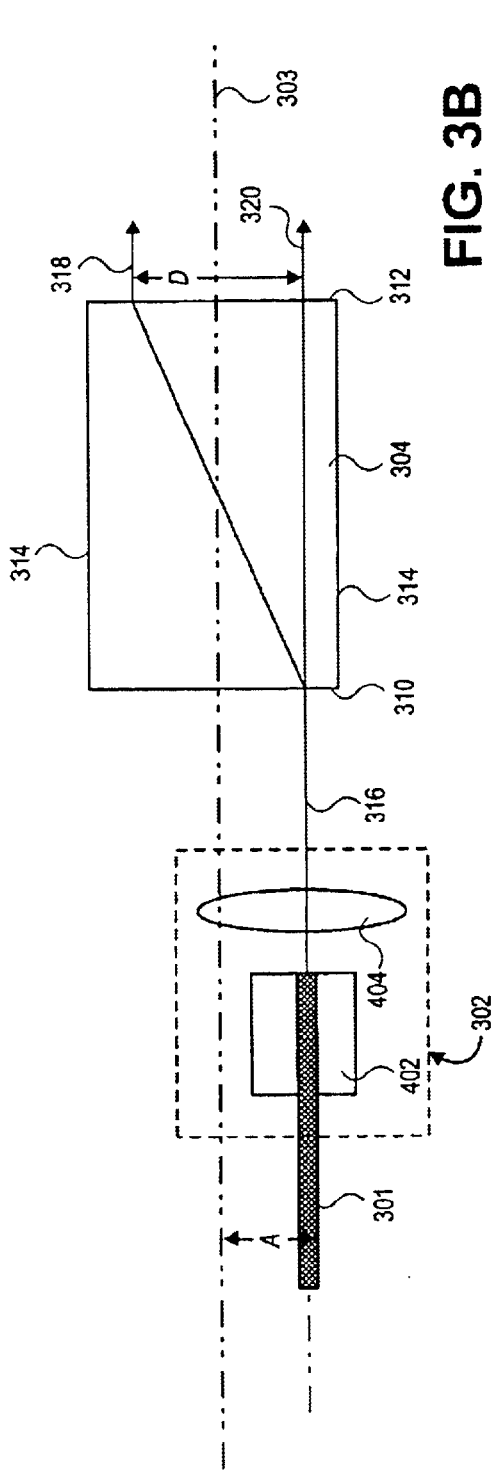
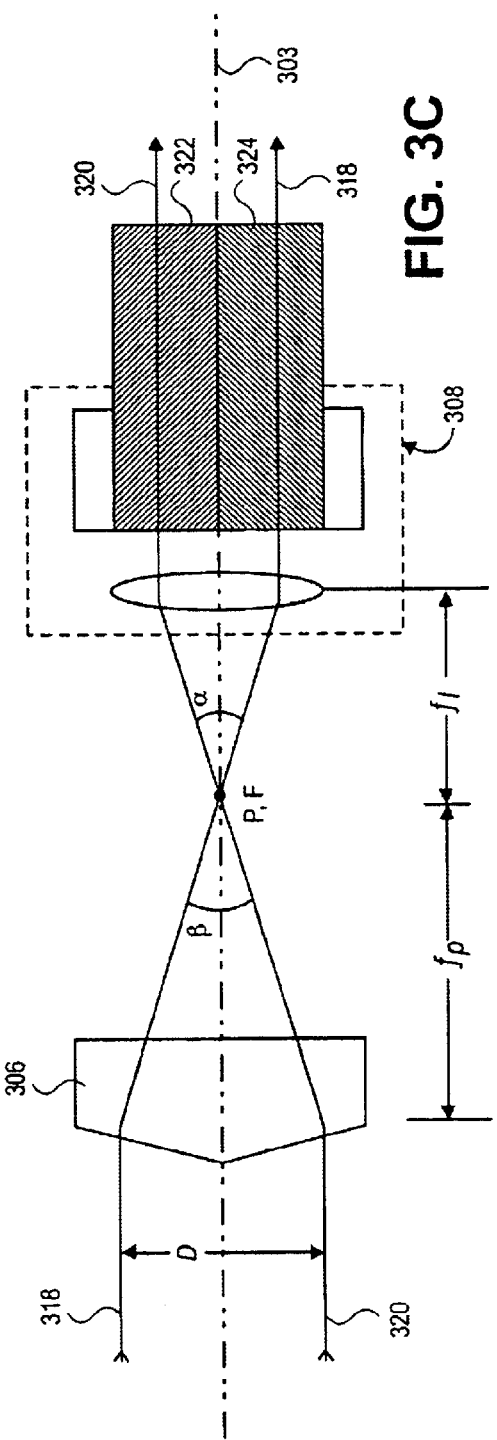
FIG. 3B
FIG. 3C

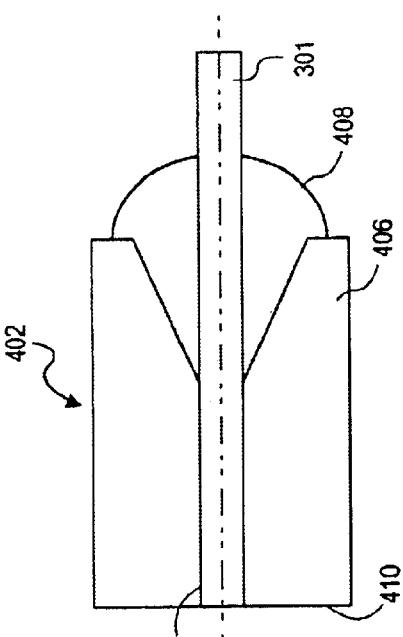
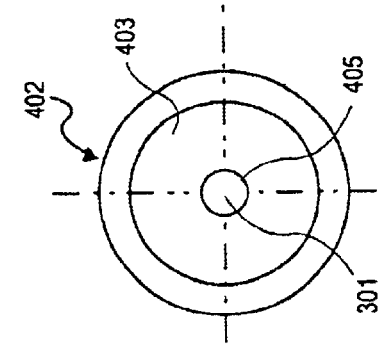
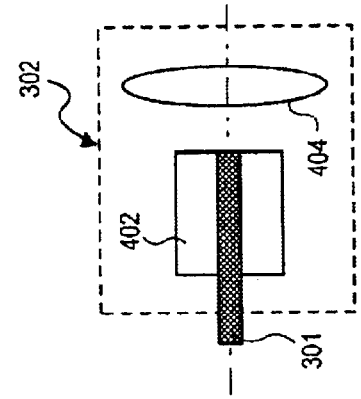
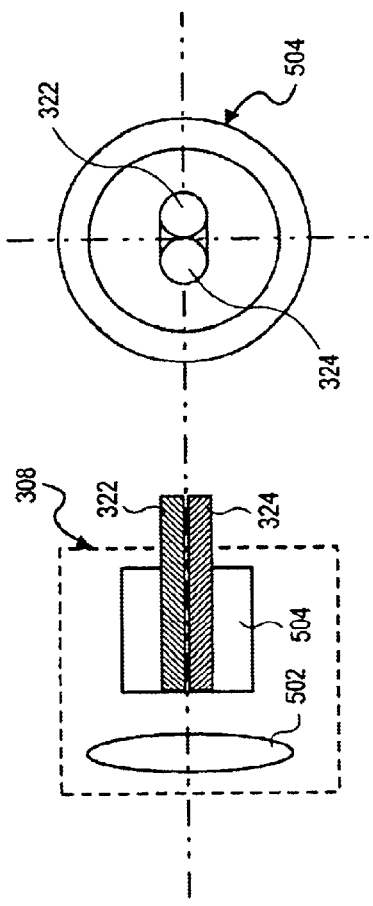
FIG. 4C
FIG. 4B
FIG. 5B
FIG. 4A
FIG. 5A

FIBER OPTIC POLARIZATION BEAM COMBINER AND SPLITTER

TECHNICAL FIELD

The present invention relates generally to beam combiners and splitters and in particular, but not exclusively, to a compact fiber optic polarization beam combiner and splitter.

BACKGROUND

Fiber coupled optical polarization beam splitters and combiners are used in fiber-based communication systems to perform various functions, for example to combine two laser beams having orthogonal polarizations to produce a single beam having a higher total output power as well as low polarization dependence. Splitting a beam is fairly straightforward but combining beams is a more difficult proposition, at least when the goal is to combine beams without excessive losses. Generally, beams can only be combined without excessive losses where the two beams being combined have different wavelengths, or when the two beams being combined have orthogonal polarizations. If the two beams have aligned polarization, the resulting interference creates a substantial instability of optical power.

A couple of approaches have been tried in the prior art to split and combine beams. FIG. 1 illustrates beam splitter 100 known in the prior art. The beam splitter 100 comprises a housing 102 within which is placed a polarizing beam splitter 104. Three collimators 106, 108 and 110 are attached to the housing 102 and each is coupled to an optical fiber; generally, the collimator 106 will be coupled to a single-mode (SM) optical fiber, while the collimators 108 and 110 will be connected to polarization-maintaining (PM) fibers. When the beam splitter 100 operates as a splitter, a light beam enters through the fiber 112 and the collimator 106, is split by the polarizing beam splitter 104, and the resulting beams are output through the collimators 108 and 110 to the optical fibers 114 and 116, respectively. The beam splitter 100 can operate as a combiner, but only if the inputs are different polarizations. Thus, when the beam splitter 100 operates as a combiner, two polarized beams are input through the fibers 114 and 116 and are combined into a single beam by the polarizing beam splitter 104, and are output through the collimator 106 into the fiber 112. The beam splitter 100, however, suffers from various disadvantages. First, it is big and bulky, making it difficult to integrate with optical packages, which tend to be very small. Second, it requires three collimators that must be very precisely aligned with the polarizing beam splitter for the device to work properly. Finally, even when the device 100 works properly is has a low extinction ratio.

FIG. 2 illustrates another beam splitter and combiner 200 known in the prior art. The beam splitter/combiner 200 comprises a pair of polarization beam displacer wedge pairs 204 sandwiched between a pair of collimators 202. Each collimator 202 comprises a grin lens 208 coupled to a ferrule 206; the ferrule 206 will either be a single-fiber ferrule of a two-fiber ferrule, as the case may be. The beam splitter/combiner 200 has several disadvantages. The large number of parts makes the splitter/combiner more expensive. Moreover, the large number of parts means that the splitter/combiner is more difficult to manufacture accurately, for example due to the tolerance buildup involved in assembling so many parts. Finally, the polarization beam displacer wedge pairs 204 create more losses and must be aligned very accurately.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 3A–3D are schematic drawings of embodiments of a beam splitter and combiner.

FIGS. 4A–4C are schematic drawings illustrating the construction of an embodiment of the single-fiber collimator shown in FIGS. 3A and 3B.

FIGS. 5A–5B are schematic drawings illustrating the construction of an embodiment of the multi-fiber collimator shown in FIGS. 3A and 3C.

DETAILED DESCRIPTION OF THE ILLUSTRATED EMBODIMENTS

Embodiments of an apparatus, system and method for splitting and combining optical beams are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
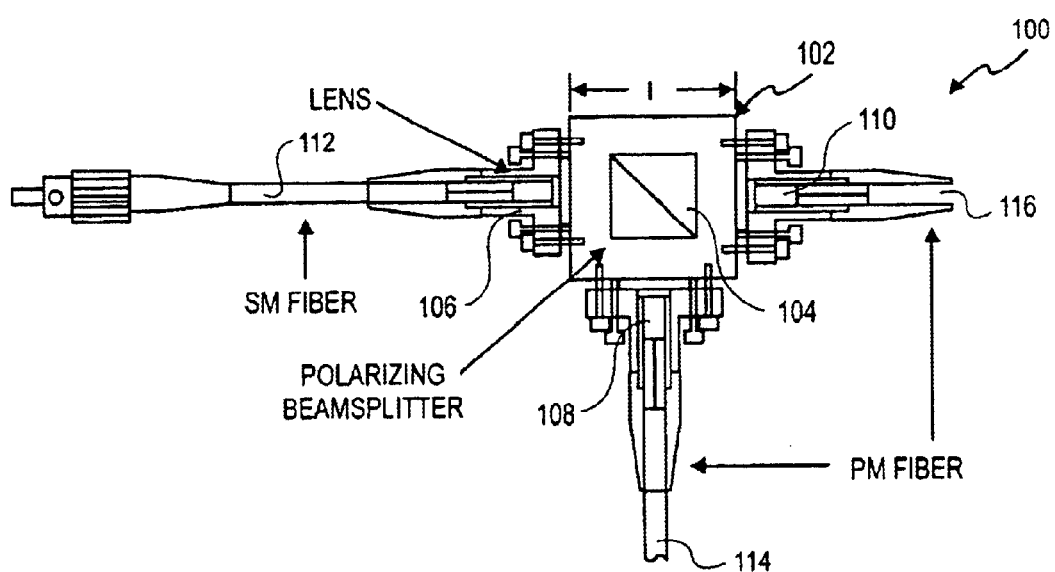
FIG. 1 is a schematic drawing of a prior art polarizing beam splitter and combiner.
Figure 2:
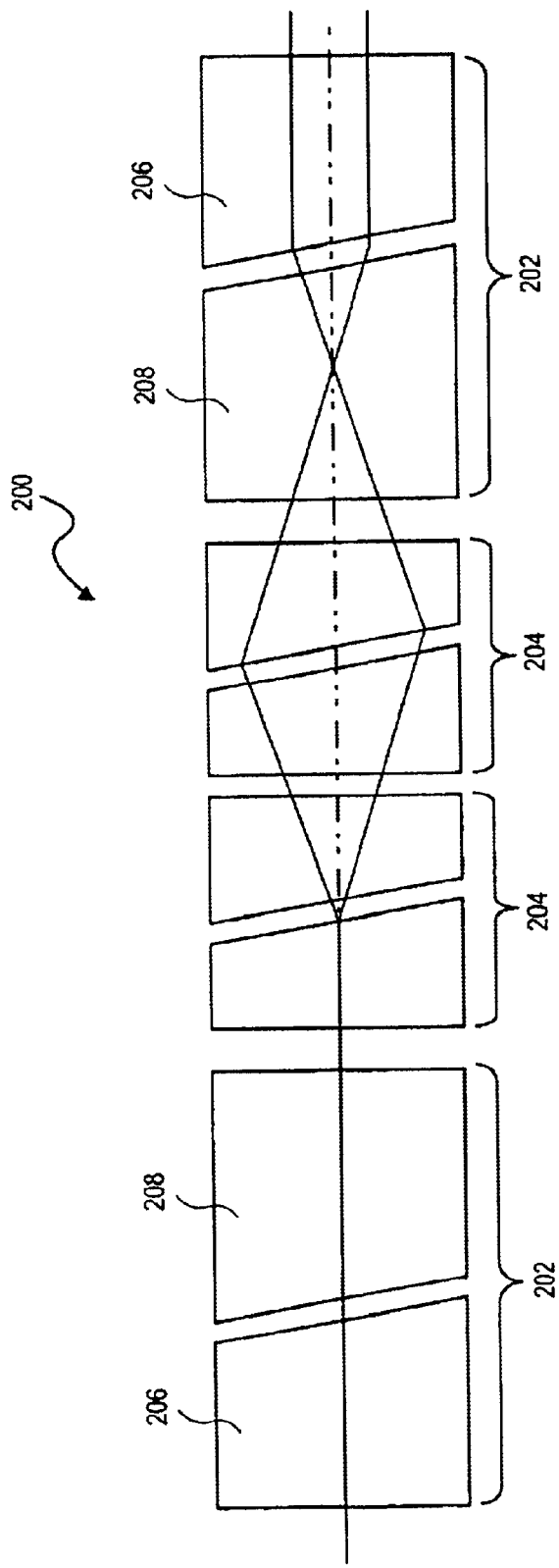
FIG. 2 is a schematic drawing of another prior art beam splitter and combiner.
Figure 3A:
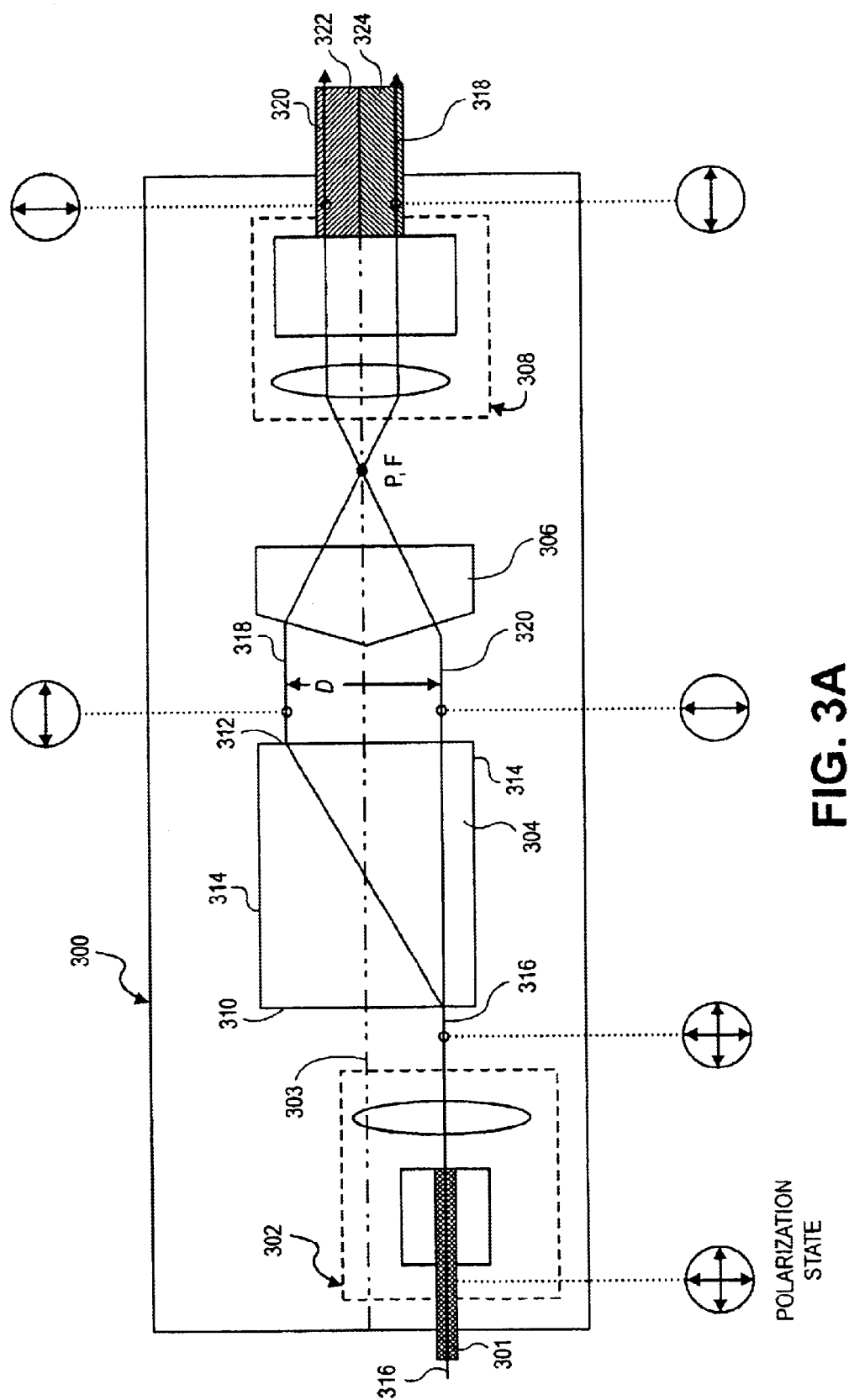

FIGS. 3A–3C illustrate different aspects of an embodiment of a beam splitter/combiner 300. FIG. 3A illustrates the construction of the splitter/combiner 300, which comprises a single-fiber collimator 302 coupled to a polarization beam displacer 304. The polarization beam displacer 304 in turn is coupled to a roof prism 306, which is then coupled to a multi-fiber collimator 308. Details of each element in the splitter/combiner 300 are discussed below in conjunction with later figures.

As its name suggests, the splitter/combiner 300 can operate in two different modes: beam splitting and beam combining. When the splitter/combiner 300 operates in beam splitting mode, an unpolarized beam 316 is input to the single-fiber collimator 302 via an optical fiber 301 connected to the single-fiber collimator. As it passes through the single-fiber collimator 302, the unpolarized beam 316 is collimated, exits the single-fiber collimator, and travels to the face 310 of the polarization beam displacer 304. When it reaches the face 310, the unpolarized beam 316 is split into a pair of polarized beams 318 and 320 having orthogonal polarizations. Since the polarized beams 318 and 320 have orthogonal polarizations, they are refracted differently by the polarization beam displacer 304, and therefore diverge as they travel through the beam displacer. The beams 318 and 320 exit the polarization beam displacer 304 at the face 312, at which point they are parallel and separated by a distance D. The distance D is chosen taking into account the profiles of the beams (e.g., a Gaussian profile) to prevent overlap of the beams.

After leaving the polarization beam displacer 304 through the face 312, both beams 318 and 320 are directed toward the roof prism 306, which refracts the beams 318 and 320 so that they converge toward the focal point P of the prism. Following the roof prism 306 is a multi-fiber collimator 308, which simultaneously collimates the beams 318 and 320 (i.e., makes the beams parallel to each other) and launches them into the optical fibers 322 and 324, respectively. Thus, the single unpolarized beam 316 that entered the splitter/combiner 300 through the fiber 301 is split into two orthogonally polarized beams that exit the splitter/combiner 300 through the optical fibers 322 and 324.

When the splitter/combiner 300 operates in combining mode, the direction of travel of the beams is simply reversed so that two beams 318 and 320 enter the splitter/combiner and a single beam leaves the splitter/combiner. The orthogonally polarized beams 318 and 320 enter splitter/combiner 300 through the multi-fiber collimator 308. Since the multi-fiber collimator is now operating in reverse, it focuses the beams 318 and 320 (i.e., it causes them to converge) and directs them toward the roof prism 306. The roof prism then refracts and collimates the two beams 318 and 320 (i.e., it causes them to become parallel to each other) and directs them toward the polarization beam displacer 304. The polarized beams 318 and 320 enter the polarization beam displacer 304 through face 312, and the polarization beam displacer causes the beams 318 and 320 to converge and meet at the face 310 of the polarization beam displacer. When they meet at the face 310, the two orthogonally polarized beams 318 and 320 are combined into a single unpolarized beam 316. The beam 316 exits the polarization beam displacer 304 through the face 310 and enters the single-fiber collimator 302. Since it is now operating in reverse, the single fiber collimator 302 focuses the unpolarized beam 316 onto the end of the optical fiber 301 and launches it into the optical fiber. Depending on the application, the optical fiber 301 can be a single-mode (SM) fiber or polarization-maintaining (PM) fiber. If the orthogonality of the polarizations in the combined beam should be maintained, PM fiber is preferred.

FIG. 3B illustrates the interface between the single-fiber collimator 302 and the polarization beam displacer 304. When the single-fiber collimator 302 is paired with the polarization beam displacer 304, the optical axis of the collimator 302 is offset from the centerline of the polarization beam displacer 304 by a distance A. The offset distance A is chosen to ensure that both the polarized beams 318 and 320 exit the polarization beam displacer through the face 312. In one embodiment, the offset distance A is approximately ½ the spacing D between the beams 318 and 320, but in other embodiments the offset distance A could be different. If the polarization beam displacer is too narrow and the offset A is too small—for example, if the optical axis of the collimator coincides with the centerline of the polarization beam displacer—the polarized beam 318 will exit the polarization beam displacer through the lateral face 314 of the displacer instead of through the face 312. Were this to happen, the polarized beam 318 would no longer be directed in the proper direction toward the roof prism 306.

The polarization beam displacer—also commonly known as a "walk-off" prism—is substantially a right square cylinder and has a pair of spaced-apart parallel faces 310 and 312 and a pair of spaced-apart lateral faces 314. The polarization beam displacer will generally be made using a birefringence material such as Yttrium Vanadium Oxide ($YVO_4$), which exhibits differential refraction of different polarizations (i.e., it refracts radiation whose polarization has a first orientation but does not refract radiation whose polarization is orthogonal to the first orientation). Suitable polarization beam displacers may be obtained, for example, from the Koncent company in Fuzhou, People's Republic of China (www.koncent.com); all that need be specified are the dimensions and the material. In operation of the polarization beam displacer 304, an unpolarized beam 316 enters the polarization beam displacer through face 310 and is split into a pair of polarized beams 318 and 320 having orthogonal polarizations. After the input beam 316 is split, the beam 320 continues straight through the polarization beam displacer 304 and exits the polarization beam displacer at the face 312. The beam 318, by contrast, is refracted and diverges from the beam 320 along a different path until it reaches the face 312 of the polarization beam displacer. Upon reaching the face 312, the beam 318 is again refracted as it exits the polarization beam displacer such that the beams 318 and 320 are substantially parallel.

FIG. 3C illustrates the interface between the roof prism 306 and the multi-fiber collimator 308. The roof prism 306 is positioned co-axially with the multi-fiber collimator 308 along the axis 303 of the splitter/combiner 300. The roof prism 306 is designed to have a focal length $f_p$, while the multi-fiber collimator 308 has a focal length $f_l$. The roof prism 306 must be positioned relative to the multi-fiber collimator 308 such that the focal point P of the prism corresponds to the focal point F of the multi-fiber collimator. In other words, the distance between the roof prism and the multi-fiber collimator must be approximately $f_p+f_l$. Moreover, the convergence angle β of the roof prism must match the convergence angle α of lens 502 (see FIG. 5A) within the multi-fiber collimator 308.

Figure 3D:
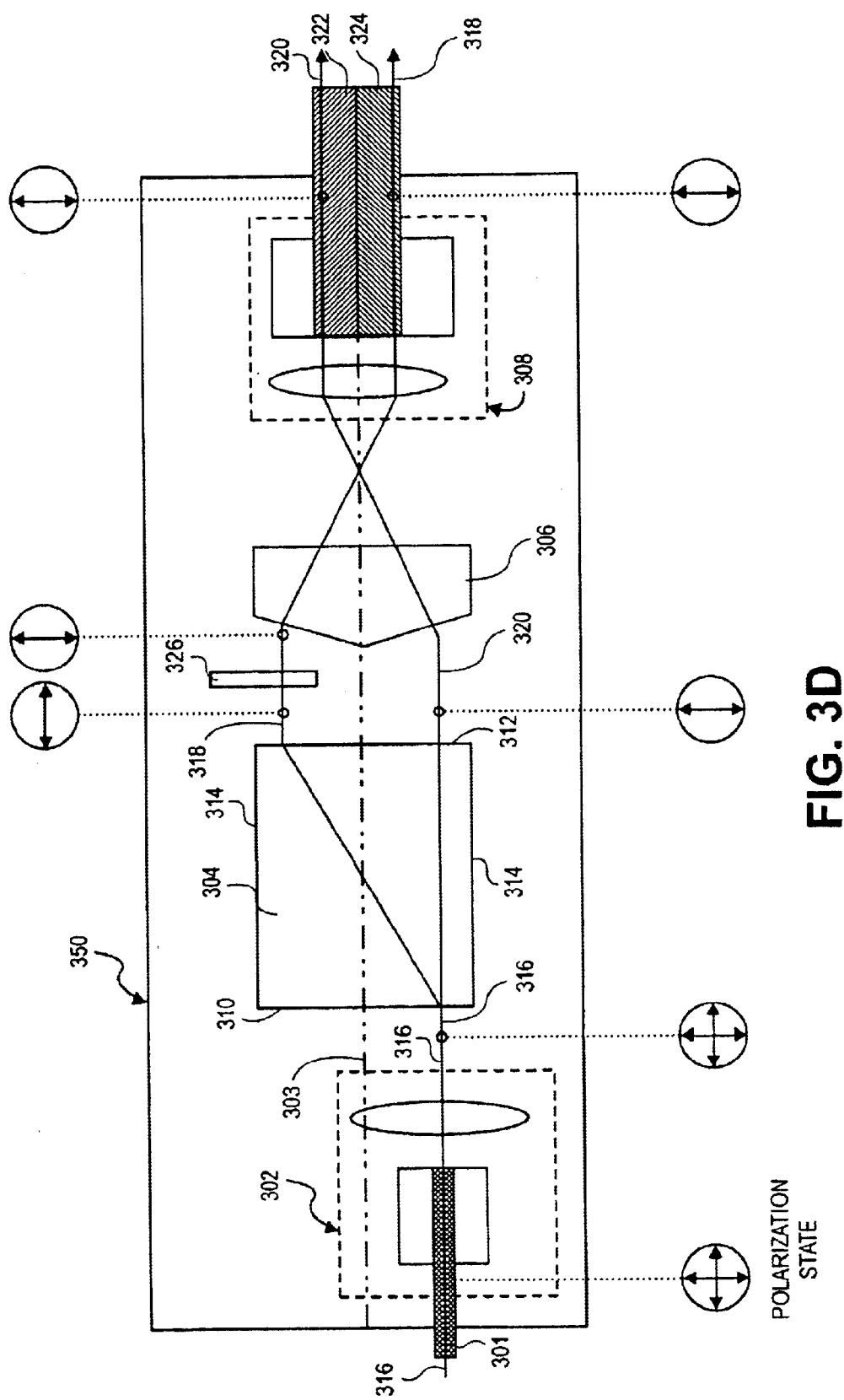

FIG. 3D illustrates an alternative embodiment of a beam splitter/combiner 350. The splitter/combiner 350 is similar in construction and operation to the splitter/combiner 300, except that the splitter/combiner 350 includes an additional optical component 326 positioned in the path of the polarized beam 318 to alter some characteristic of that beam. In one embodiment, the optical component 326 can be a phase retardation plate that rotates the polarization of the beam 318 by a specified amount. For example, a phase retardation plate can be used to rotate the polarization of the beam 318 by 90 degrees, such that the polarizations of the two beams 318 and 320 are aligned as shown, although a phase retardation plate can also be used to rotate the polarization by an amount different than 90 degrees. In other embodiments, however, the optical component can be something else that alters some other characteristic of the beam. Moreover, although the optical component 326 is shown in the path of the beam 318, in other embodiments it is possible to also have it in the optical path of the beam 320 or to have optical components in the optical paths of both beams 318 and 320.

FIGS. 4A–4C illustrate the construction of the single-fiber collimator 302 (see FIGS. 3A and 3B). FIG. 4A illustrates that the single-fiber collimator 302 comprises a single-fiber ferrule 402 and a lens 404, both positioned within a housing 403 that holds the ferrule and the lens and maintains their relative positions. An optical fiber 301 carrying an unpolarized beam enters the housing 403 and is held securely therein by the ferrule 402. The ferrule 402 holds the optical fiber 301 so that it is aligned with the optical axis of the lens 404, and such that the end of the fiber 301 from which radiation emerges is substantially at the focal point of the lens 404. In one embodiment, the lens 404 is an aspheric lens, although in other embodiments other types of lenses may be used as well.

FIGS. 4B and 4C together illustrate a cross-section of an embodiment of the single-fiber ferrule 402. As shown if FIG. 4B, the ferrule 402 is generally cylindrical and has a substantially round cross-section, although in other embodiments different cross-sectional shapes can be used as well. The ferrule includes a tapered interior portion 403 shaped like a frustum leading to a hole 405 into which the fiber 301 is inserted. FIG. 4C illustrates a side cross-section of the ferrule. The fiber 301 is inserted into the hole 405 until the end of the fiber is substantially aligned with the face 410 of the ferrule. In one embodiment, the end of the fiber can be ground and polished after its insertion in the ferrule so that it aligns almost exactly with the end 410. A glob of epoxy 408 is dispensed into the tapered portion 403, so that once cured it secures the fiber 301 in position.

FIGS. 5A–5B illustrate the construction of the multi-fiber collimator 308 (see FIGS. 3A and 3C). The multi-fiber collimator 308 is similar in construction to the single-fiber collimator 302, except that the ferrule 504 is designed to hold the two optical fibers 322 and 324 instead of just one fiber. The separation between fibers 322 and 324 is calculated such that the spacing between the centers of the fibers matches the spacing between the polarized beams 318 and 320.

Figure 6A:
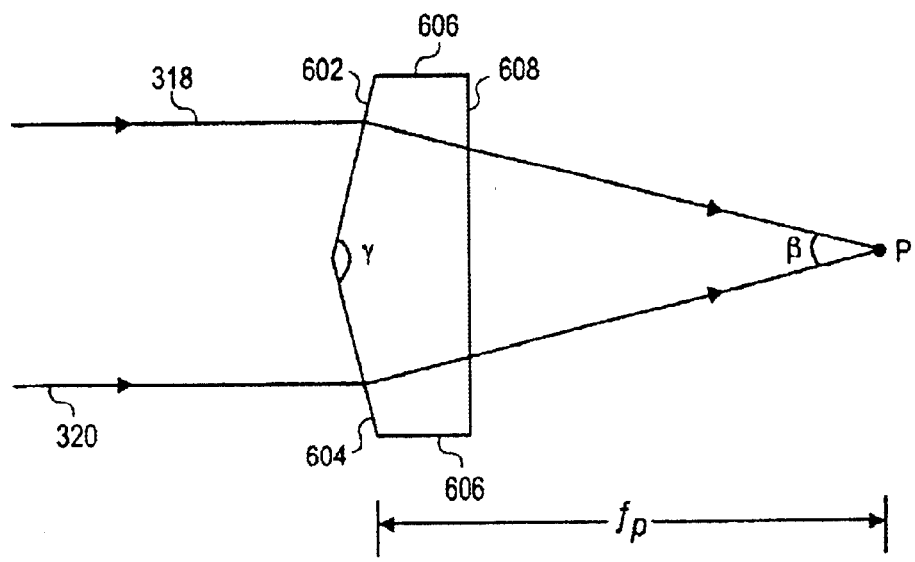
FIGS. 6A–6B are schematic drawings illustrating the construction and orientation of an embodiment of the roof prism shown in FIGS. 3A and 3C.
Figure 6B:
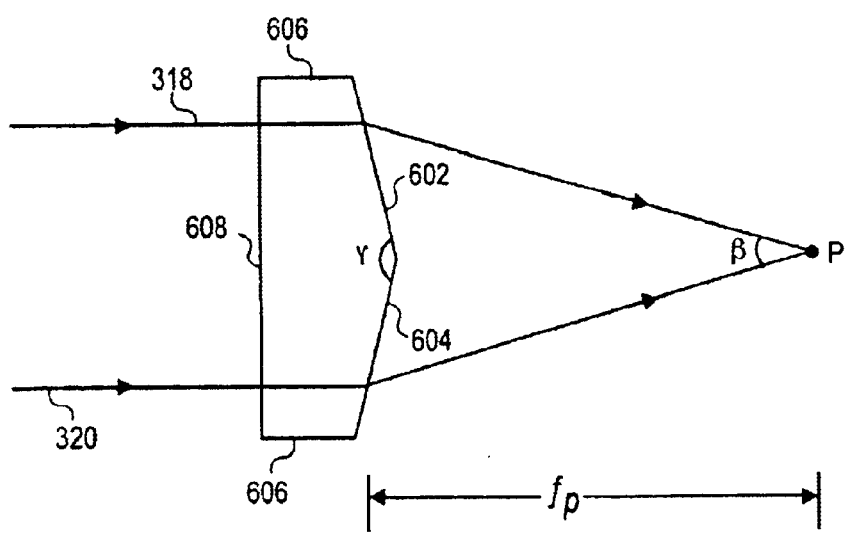

FIGS. 6A and 6B illustrate the construction of an embodiment of the roof prism 306 (see FIGS. 3A and 3C). FIG. 6A illustrates the prism in the orientation shown in FIGS. 3A and 3C, with the polarized beams 318 and 320 entering the prism through the refracting faces 602 and 604. The roof prism 306 comprises a prism having a generally pentagonal cross section including a pair of refracting faces 602 and 604 positioned at an angle γ (known as the "roof angle") relative to each other, a pair of lateral faces 606, and a normal face 608. The convergence angle β of the beams passing through the roof prism depends on the roof angle γ and the refractive index of the prism. In one embodiment in which the prism is made using fused silica, the roof angle γ is approximately 171.04 degrees, although in other embodiments the roof angle γ can have a different value. As discussed above, the convergence angle β of the roof prism must match the convergence angle α of the multi-fiber collimator. The angle β can be fine tuned to match α by rotating the roof prism around its roof edge, which is the edge at the intersection of the refracting faces 602 and 604. Suitable roof prisms may be obtained, for example, from the Koncent company in Fuzhou, People's Republic of China (www.koncent.com); all that need be specified is the physical dimensions (height, width and depth) of the prism and the desired convergence angle β of the beams 318 and 320. The roof prism 306 can be made using BK-7 grade A optical glass, fused silica, or other materials having the required or desired optical properties.

FIG. 6B illustrates a different orientation in which the prism has been rotated 180 degrees so that the beams 318 and 320 enter the prism through the normal face 608 instead of through the refracting faces 602 and 604. Both the orientations shown in FIGS. 6A and 6B can be used, although one may best fit the requirements for a given application. For example, the orientation shown in FIG. 6A is more suitable in applications where it is necessary to minimize reflected light from traveling back down the fiber 301.

Figure 7A:
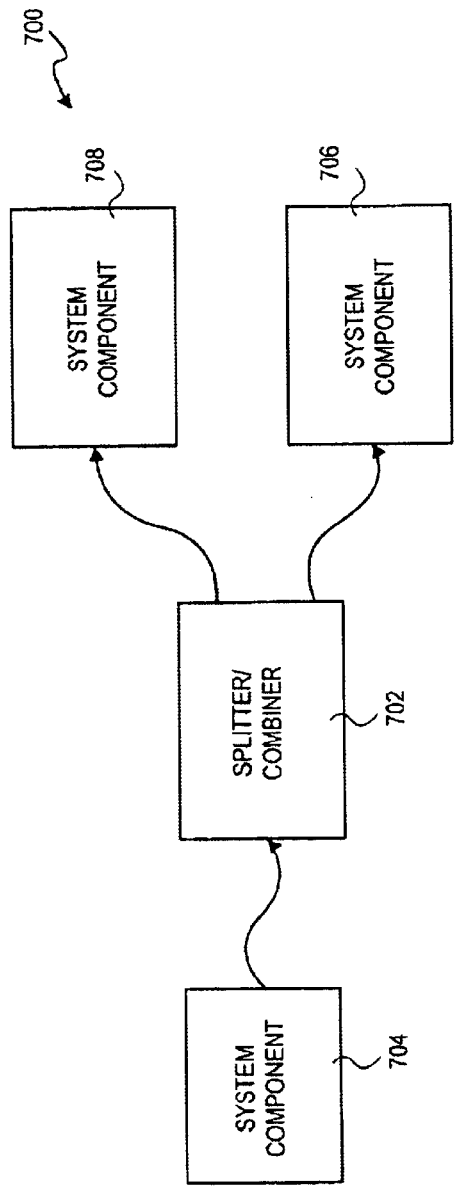
FIGS. 7A–7B are schematic drawings illustrating embodiments of optical systems incorporating a beam splitter and combiner.
Figure 7B:
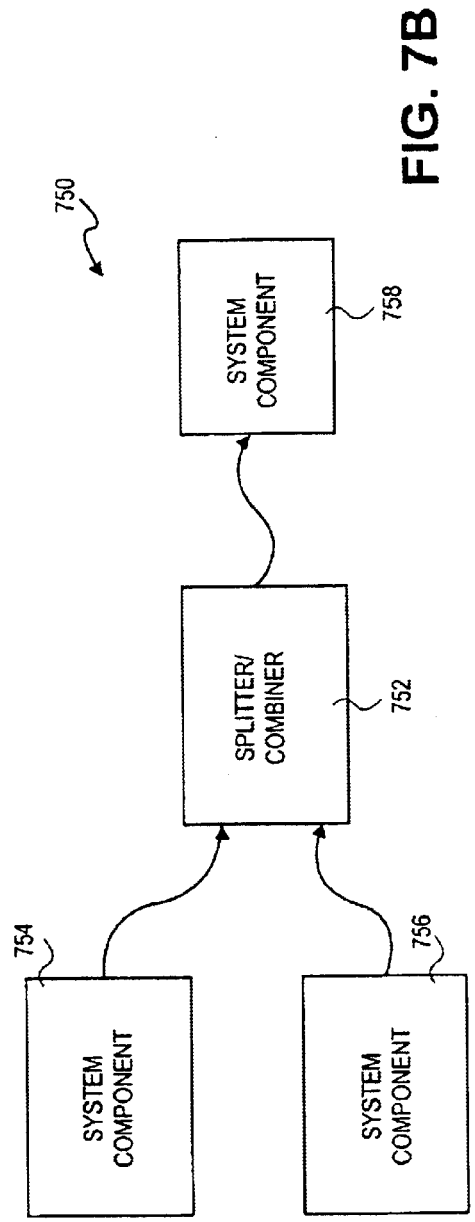

FIGS. 7A and 7B illustrate optical systems using a beam splitter/combiner such as the splitter/combiners 300 or 350. FIG. 7A illustrates a system 700 where the splitter/combiner 702 operates in splitting mode. A first optical system element 704 is coupled to the input of the splitter/combiner, and a second optical system element 706 and third optical system element 708 are coupled to the outputs of the splitter/combiner. In one embodiment, the first optical system element 704 can be a light source such as a laser, and one or both of the second and third optical system elements 706 and 708 can be a photodetector. In other embodiments, however, the first, second and third optical system elements can be any of the many different types of components found in optical systems, for example an optical communication system.

FIG. 7B illustrates a system 750 with a splitter/combiner 702 operating in combining mode. A first optical system element 754 and second optical system element 756 are coupled to the inputs of the splitter/combiner 702, and a third optical system element 758 is coupled to the output of the splitter/combiner. In one embodiment, one or both of the first optical system element 754 and the second optical system element 756 can be a light source such as a laser, and the third optical system element 758 can be a photodetector. In other embodiments, however, the first, second and third optical system elements can be any of the many different types of components found in optical systems, for example an optical communication system.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
    a single-fiber collimator;
    a polarization beam displacer positioned to receive an unpolarized beam from the single-fiber collimator;
    a roof prism positioned to receive a first polarized beam and a second polarized beam from the polarization beam displacer; and
    a multi-fiber collimator positioned to receive the first and second polarized beams from the roof prism.

2. The apparatus of claim 1 wherein the multi-fiber collimator comprises:
    a multi-fiber ferrule to hold first and second optical fibers; and
    a lens positioned near the ends of the first and second optical fibers to focus the first and second polarized beams into the first and second optical fibers.

3. The apparatus of claim 2 wherein a convergence angle of the roof prism is approximately equal to a convergence angle of the lens.

4. The apparatus of claim 3 wherein the roof prism can be rotated about its roof edge to fine-tune the convergence angle of the roof prism so that it is equal to the convergence angle of the lens.

5. The apparatus of claim 1, further comprising an optical component positioned in the optical path of at least one of the first and second polarized beams to alter a characteristic of the beam.

6. The apparatus of claim 5 wherein the optical component is a phase retardation plate and the characteristic is the polarization.

7. The apparatus of claim 1 wherein the single fiber collimator comprises:
a single-fiber ferrule to hold an optical fiber; and
a lens to collimate a beam emitted from an end of the optical fiber.

8. The apparatus of claim 7 wherein the lens is aspheric.

9. The process of claim 1 wherein the beam displacer is made using Yttrium Vanadium Oxide ($YVO_4$).

10. The apparatus of claim 1 wherein the roof prism is made using fused silica or BK-7 optical glass.

11. An apparatus comprising:
a multi-fiber collimator positioned to focus a first polarized beam and a second polarized beam;
a roof prism positioned to collimate the first polarized beam and the second polarized beam received from the multi-fiber collimator;
a polarization beam displacer positioned to receive the first and second polarized beams from the roof prism; and
a single-fiber collimator to receive an unpolarized beam from the polarization beam displacer.

12. The apparatus of claim 11 wherein the multi-fiber collimator comprises:
a multi-fiber ferrule to hold a first optical fiber and a second optical fiber, the first optical fiber carrying the first polarized beam and the second optical fiber carrying the second polarized beam; and
a lens positioned near the ends of the first and second of optical fibers.

13. The apparatus of claim 12 wherein a convergence angle of the roof prism is approximately equal to a convergence angle of the lens.

14. The apparatus of claim 13 wherein the roof prism can be rotated about its roof edge to fine-tune the convergence angle of the roof prism so that it is equal to the convergence angle of the lens.

15. The apparatus of claim 11 wherein the single fiber collimator comprises:
a single-fiber ferrule to hold an optical fiber; and
a lens positioned near an end of the optical fiber.

16. The apparatus of claim 15 wherein the lens is aspheric.

17. The apparatus of claim 11, further comprising an optical component positioned in the optical path of at least one of the first and second polarized beams to alter a characteristic of the beam.

18. The apparatus of claim 17 wherein the optical component is a phase retardation plate and the characteristic is the polarization.

19. The process of claim 11 wherein the polarization beam displacer is made using Yttrium Vanadium Oxide ($YVO_4$).

20. The apparatus of claim 11 wherein the roof prism is made using fused silica or BK-7 optical glass.

21. A system comprising:
a first optical system element;
a single-fiber collimator coupled to the first optical system element by an optical fiber;
a polarization beam displacer positioned to receive an unpolarized output from the single-fiber collimator;
a roof prism positioned to receive first and second polarized beams from the polarization beam displacer;
a multi-fiber collimator positioned to receive the pair of polarized outputs of the roof prism; and
second and third optical system elements coupled to the multi-fiber collimator by a plurality of optical fibers.

22. The apparatus of claim 21, further comprising an optical component positioned in the optical path of at least one of the first and second polarized beams to alter a characteristic of the beam.

23. The apparatus of claim 22 wherein the optical component is a phase retardation plate and the characteristic is the polarization.

24. The system of claim 21 wherein the first optical system element is a light source and at least one of the second and third optical system elements is a photodetector.

25. A system comprising:
first and second optical system elements;
a multi-fiber collimator coupled to the first and second optical system elements to focus a first polarized beam and a second polarized beam; and
a roof prism positioned to receive first and second polarized beams from the multi-fiber collimator;
a polarization beam displacer positioned to receive the first and second polarized beams from the roof prism;
a single-fiber collimator positioned to receive an unpolarized beam from the polarization beam displacer;
a third optical system element coupled to the single-fiber collimator by an optical fiber.

26. The apparatus of claim 25, further comprising an optical component positioned in the optical path of at least one of the first and second polarized beams to alter a characteristic of the beam.

27. The apparatus of claim 26 wherein the optical component is a phase retardation plate and the characteristic is the polarization.

28. The system of claim 25 wherein at least one of the first and second optical system element is a light source and the third optical system elements is a photodetector.

29. A process comprising:
collimating an unpolarized beam;
separating the unpolarized beam into first and second polarized beams using a polarization beam displacer;
converging the first and second polarized beams using a roof prism; and
focusing the first and second polarized beams into first and second optical fibers.

30. The process of claim 29 wherein focusing the first and second polarized beams into first and second optical fibers comprises:
securing the first and second optical fibers using multi-fiber ferrule; and
focusing the first and second beams into the first and second fibers using a lens positioned near the ends of the first and second optical fibers.

31. The process of claim 30, further comprising rotating the roof prism about its roof edge to fine-tune a convergence angle of the roof prism so that it is equal to a convergence angle of the lens.

32. The process of claim 29, further comprising using an optical component to alter a characteristic of at least one of the polarized beams.

33. The process of claim 22 wherein the optical component is a phase retardation plate and the characteristic is the polarization.

34. The process of claim 29 wherein the polarization of the first polarized beam is orthogonal to the polarization of the second polarized beam.

35. The process of claim 30 wherein focusing the first and second beams into the first and second fibers comprises focusing using an aspheric lens.

36. A process comprising:

focusing first and second polarized beams;

collimating the first and second polarized beams using a roof prism;

combining the first and second polarized beams into a single unpolarized beam using a polarization beam displacer; and focusing the unpolarized beam into an optical fiber.

37. The process of claim 36 wherein focusing the first and second polarized beams comprises focusing the first and second beams using a lens.

38. The process of claim 37, further comprising rotating the roof prism about its roof edge to fine-tune a convergence angle of the roof prism so that it is equal to a convergence angle of the lens.

39. The process of claim 36, further comprising using an optical component to alter a characteristic of at least one of the polarized beams.

40. The process of claim 39 wherein the optical component is a phase retardation plate and the characteristic is the polarization.

41. The process of claim 36 wherein the polarization of the first polarized light beam is orthogonal to the polarization of the second polarized light beam.

42. The process of claim 36 wherein focusing the unpolarized beam into an optical fiber comprises:

securing the optical fiber with a single-fiber ferrule; and focusing the unpolarized beam on an end of the optical fiber.

43. The process of claim 37 wherein focusing the unpolarized beam comprises focusing the beam using an aspheric lens.

* * * * *